(12) United States Patent
Williams

(10) Patent No.: US 6,988,598 B2
(45) Date of Patent: Jan. 24, 2006

(54) DISC BRAKE ROTOR MOUNTING SYSTEM

(75) Inventor: Mark Williams, Louisville, CO (US)

(73) Assignee: Mark Williams Enterprises, Inc., Louisville, CO (US)

( * ) Notice: Subject to any disclaimer, the term of this patent is extended or adjusted under 35 U.S.C. 154(b) by 0 days.

(21) Appl. No.: 10/830,102

(22) Filed: Apr. 23, 2004

(65) Prior Publication Data

US 2004/0195059 A1 Oct. 7, 2004

Related U.S. Application Data

(63) Continuation-in-part of application No. 10/302,936, filed on Nov. 25, 2002, now abandoned.

(60) Provisional application No. 60/332,566, filed on Nov. 26, 2001.

(51) Int. Cl.
B60T 1/06 (2006.01)

(52) U.S. Cl. .............................. 188/218 XL; 188/18 A

(58) Field of Classification Search ......... 188/218 XL, 188/18 A
See application file for complete search history.

(56) References Cited

U.S. PATENT DOCUMENTS

| | | | |
|---|---|---|---|
| 3,405,784 A | 10/1968 | Henry-Biabaud | 188/18 |
| 3,542,166 A | 11/1970 | Harrison | 188/218 |
| 3,941,221 A | 3/1976 | Pringle | 188/218 XL |
| 4,662,482 A * | 5/1987 | Bass | 188/18 A |
| 4,705,145 A | 11/1987 | Goulart | 188/18 A |
| 4,821,848 A | 4/1989 | Izumine | 188/218 |
| 4,848,521 A | 7/1989 | Izumine | 188/18 |
| 4,984,661 A | 1/1991 | Meynier | 188/71.5 |
| 5,190,124 A | 3/1993 | Haneda | 188/218 XL |
| 5,297,660 A | 3/1994 | Wiebelhaus et al. | 188/128 |
| 5,520,269 A | 5/1996 | Yamamoto et al. | 188/218 XL |
| 5,921,633 A | 7/1999 | Neibling et al. | 301/6.1 |
| 6,079,512 A | 6/2000 | Krisher | 180/259 |
| 6,135,247 A | 10/2000 | Bodin et al. | 188/218 XL |
| 6,164,421 A | 12/2000 | Nakamura et al. | 188/71.5 |
| 6,206,144 B1 | 3/2001 | Di Bella | 188/26 |
| 6,223,863 B1 | 5/2001 | Bunker | 188/18 A |
| 6,247,560 B1 | 6/2001 | Bunker | 188/18 A |
| 6,267,210 B1 | 7/2001 | Burgoon et al. | 188/218 XL |
| 6,325,722 B1 | 12/2001 | Ciotola | 464/85 |
| 6,328,137 B1 | 12/2001 | Rancourt | 188/18 A |
| 6,336,531 B1 | 1/2002 | Chou | 188/218 XL |
| 6,561,298 B2 * | 5/2003 | Buell et al. | 180/221 |
| 6,672,419 B2 | 1/2004 | Buell et al. | 180/221 |
| 2001/0052435 A1 | 12/2001 | Montague | |

* cited by examiner

Primary Examiner—Robert A. Siconolfi
(74) Attorney, Agent, or Firm—G. Paul Edgell; Fitch, Even, Tabin & Flannery

(57) ABSTRACT

A mounting system for disc brake rotors. Drive pins are mounted to a wheel hub. Alignment bushings having outer flanges defining a channel are slidably held in slots in a disc brake rotor, with the rotor engaging the bushing channel. The alignment bushings are each mounted on a drive pin inserted through a hole in the alignment bushing. Drag rings prevent unwanted movement between the alignment bushings and the drive pins. The drag rings can be mounted in grooves in the alignment bushings or, alternatively, in grooves on the drive pins. Retaining rings on the drive pins prevent the bushings from coming off of the drive pins.

22 Claims, 4 Drawing Sheets

DISC BRAKE ROTOR MOUNTING SYSTEM

CROSS REFERENCE TO RELATED APPLICATION

The present application is a continuation-in-part of U.S. application Ser. No. 10/302,936, filed on Nov. 25, 2002 now abandoned, which claims the benefit of U.S. provisional application No. 60/332,566, filed on Nov. 26, 2001.

FIELD OF THE INVENTION

The present invention relates to disc brake systems, and more particularly, to disc brake systems used in high performance or racing applications.

BACKGROUND OF THE INVENTION

In conventional disc brake systems, the rotor is generally rigidly attached to the wheel or hub. With this type of attachment method, the rotor runout must be generally controlled within approximately 0.003 inches to 0.005 inches. Some racing vehicles, such as used in some classes of drag racing, utilize specialized racing aluminum wheels and the rotor must be mounted directly to such wheels. However, these wheels often do not have a mounting surface that runs true enough to mount the rotor within the permissible range of runout without additional machining. This additional machining requires additional work time and expense and can reduce the strength of the wheel.

SUMMARY OF THE INVENTION

The present invention provides a disc brake rotor mounting system that enables self-alignment of the rotor without the need for a precision mounting surface on the wheel.

The system includes a wheel adapter for mounting to a surface of the wheel. A plurality of cylindrical drive pins are fastened to the wheel adapter at a common distance from an axis of the wheel adapter. A rotor includes a like number of radially aligned drive slots opening to a central portion of the rotor. Each drive slot is adapted to receive an alignment bushing that is generally D-shaped in one embodiment. Each alignment bushing includes a central channel bounded on both sides by flanges. The central channel is adapted for engaging opposing sides of the drive slot and the flanges are adapted for engaging opposing sides of the rotor in the region surrounding the drive slot to axially retain the alignment bushing to the rotor. Each alignment bushing also includes a cylindrical through-bore adapted to slidingly engage one of the cylindrical drive pins and retain the rotor to the wheel adapter.

As the alignment bushings are able to axially slide on the drive pins, the rotor is able to self-align itself with respect to the wheel adapter and wheel responsive to forces exerted on it by the calipers during breaking. Further, since the alignment bushings are able to slide radially in the drive slots of the rotor, the rotor can expand and contract due to temperature changes and not induce stresses in the rotor.

A drag ring is also positioned between the alignment bushings and their respective drive pins to prevent unwanted axial movement or chatter of the rotor once the rotor is aligned.

It is an object of the present invention to provide a system for self-aligning a wheel mounted disc brake rotor so as to have a maximum runout within a permissible range.

It is also an object of the present invention to provide a system for aligning a disc brake rotor mounted to a wheel without requiring machining of the wheel surface where the rotor mounts.

It is also an object of the present invention to provide a system for self-aligning a wheel-mounted rotor upon initial installation and setup of the brake system.

It is also an object of the present invention to provide a system for self-adjusting the position and alignment of a wheel-mounted disc brake rotor as the disc brake pads wear over time.

DETAILED DESCRIPTION OF THE INVENTION

The present invention is directed to a system for mounting a brake rotor to a hub or wheel.

Figure 1:
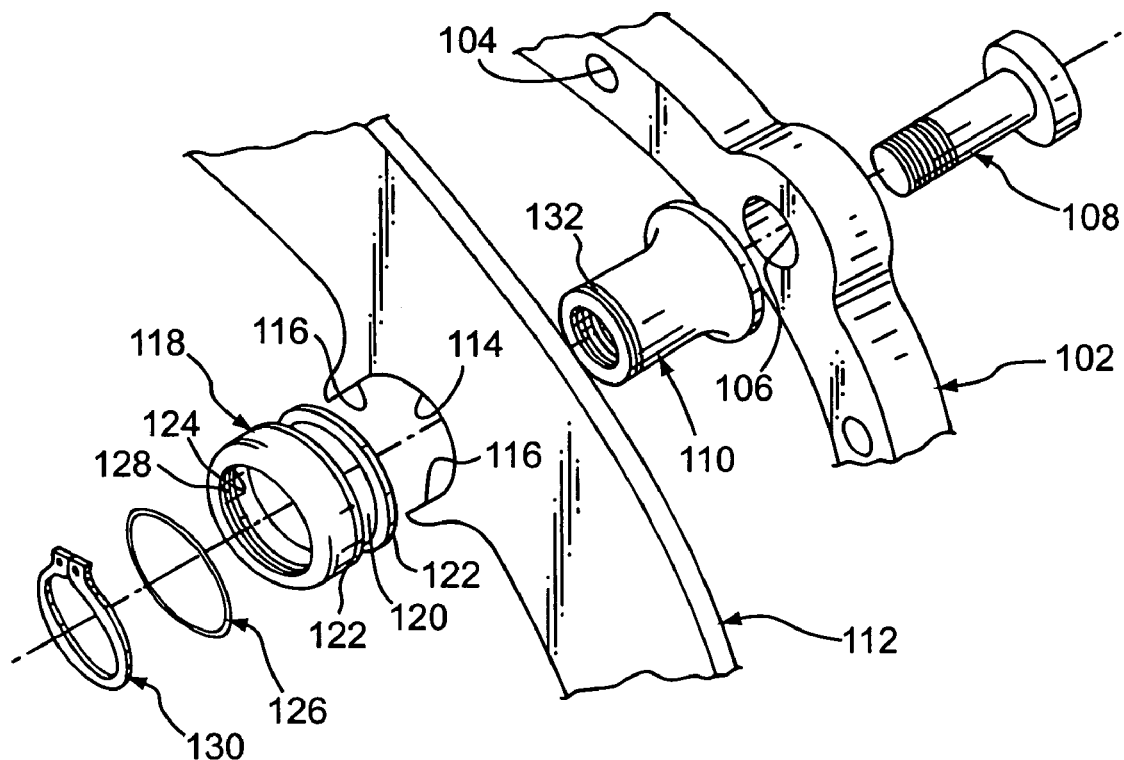
FIG. 1 shows an exploded view of a disc brake rotor mounting system according to one embodiment of the invention.

FIG. 1 shows an exploded view of the disc brake mounting system according to one embodiment of the invention. In a preferred embodiment, a generally circular wheel adapter 102 is adapted for mounting to a surface of a hub or wheel (not shown) with fasteners (not shown) engaging the hub or wheel through a plurality of wheel attachment bores 104 spaced around a circumference of the wheel adapter 102. The wheel adapter 102 also includes a plurality of drive pin bores 106 spaced around its circumference through which a like plurality of drive pin attachment bolts 108 can be inserted to threadingly engage a like plurality of drive pins 110. The drive pin attachment bolts 108 securely fasten the drive pins 110 to the wheel adapter 102. Each drive pin 110 is generally cylindrical and can include an enlarged base for engaging a surface of the wheel adapter 102. In an alternate embodiment, the drive pins 110 may be directly mounted to the hub or wheel without the use of the adapter 102.

The brake rotor 112 includes a plurality of radially aligned drive slots 114 positioned to align with the plurality of drive pins 110. In one embodiment, each drive slot 114 includes a pair of substantially straight drive surfaces 116. In a preferred embodiment, drive slots 114 include two drive surfaces 116 that are straight and parallel to each other.

Alignment bushings 118 mount between each of the rotor drive slots 114 and a corresponding drive pin 110. Each alignment bushing 118 is shaped to mate with a corresponding drive slot 114. In a preferred embodiment, the alignment bushings 118 are generally D-shaped. The alignment bushings 118 include a central channel 120 and a pair of flanges 122. The raised flanges 122 slidingly engage opposing sides of the brake rotor 112 and axially retain each alignment bushing 118 with respect to its corresponding drive slot 114. In one embodiment, the width of the central channel 120 can be wider than the thickness of the brake rotor 112 to allow some free movement of the brake rotor 112 back and forth in the central channel 120. Alternately, the central channel 120 can be so dimensioned so as to provide a minimum static frictional force against movement of the alignment bushing 118 in or out of the drive slot 114. In a preferred embodiment, the central channel 120 is so dimensioned that the flanges 122 prevent any substantial movement of the alignment bushings 118 and the brake rotor 112 relative to each other in the direction perpendicular to the plane of the brake rotor 112 and the drive slots 114 contained therein, while allowing free movement of the alignment bushings 118 in a direction in or out of the drive slots 114.

In a preferred embodiment, the central channel 120 includes a pair of parallel drive surfaces (shown in FIG. 2 later herein) adapted to slidingly engage parallel drive surfaces 116 of the drive slot for transmitting torque from the brake caliper (not shown), through the brake rotor 112, to the alignment bushing 118. Each alignment bushing 118 also includes an axial through-bore 124 for mounting over a corresponding drive pin 110. This mounting between the drive pin 110 and the alignment bushing 118 allows the alignment bushing 118 to axially slide on the drive pin 110, thereby allowing the axial positioning of the brake rotor 112 in the region of that drive pin 110 to change with respect to the wheel adapter 102 and the hub or wheel.

In a preferred embodiment, a drag ring 126 is provided to seat in a drag ring groove 128 in the bushing through-bore 124. This embodiment is also visible in better detail in cross-section in FIG. 4. The drag ring 126 is preferably a stainless steel split ring that is sized to provide a low level friction fit between the alignment bushing 118 and the drive pin 110. This friction fit is not so great to prevent axial movement of the rotor when necessary for alignment but prevents unwanted axial movement which can result in chatter as well as increased wear. An alternative embodiment has the drag ring 126 seated in a drag ring groove in the drive pin 110, shown in cross-section in FIG. 5.

A retaining ring 130 mounts in a retaining ring groove 132 on each drive pin 110 to prevent the alignment bushing 118 from disengaging from the drive pin 110.

In operation during braking, calipers press on the brake rotor 112, causing torque on the brake rotor 112 resistant to the rotation of the wheel to which the brake rotor 112 is attached. This torque is transmitted as force through the alignment bushings 118 to the drive pins 110 and so on to the wheel itself. As the calipers grip on the brake rotor 112, any misalignment of the brake rotor 112 will result in the calipers exerting greater force on one or the other side of the brake rotor 112. In such a case, once the net force on the brake rotor 112 overcomes the resistance of the drag rings 126, the brake rotor 112 will slide in or out on the drive pins 110 until located such that the calipers exert the same force on both sides of the brake rotor 112. Once the braking operation subsides and the calipers no longer exert any force on the brake rotor 112, the brake rotor 112 stays fixed in its new location and orientation due to the drag rings 126.

Figure 2:
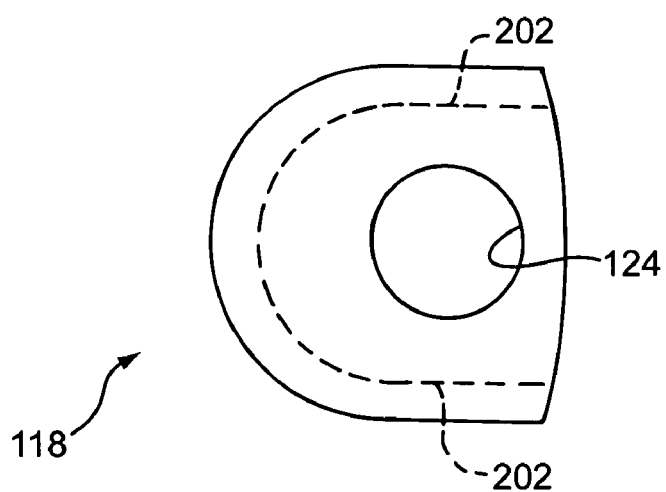
FIG. 2 shows a top view of an alignment bushing according to one embodiment of the invention.

FIG. 2 shows a top view of an alignment bushing 118 according to one embodiment of the invention. As discussed in reference to FIG. 1, the alignment bushing 118, in one embodiment, has substantially straight drive surfaces 202 located in the central channel 120. In a preferred embodiment, the drive surfaces 202 are straight and parallel to each other. As discussed in reference to FIG. 1, in a preferred embodiment, the drive surfaces 202 slidingly engage the drive surfaces 116 of the brake rotor 112.

Figure 3:
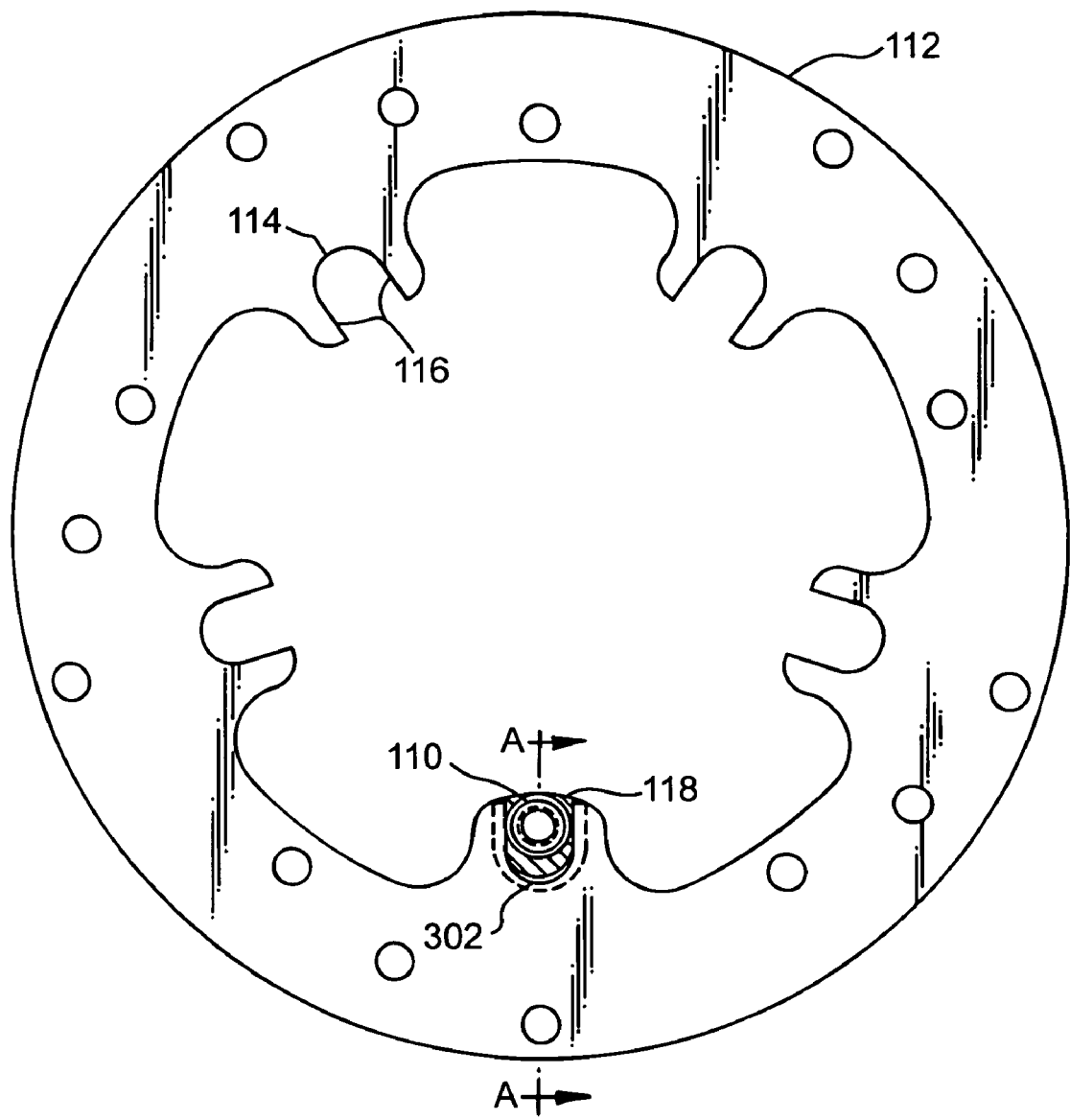
FIG. 3 shows a top view of a disc brake rotor according to one embodiment of the invention.

FIG. 3 shows a brake rotor 112 with details of the mounting for one drive slot 114. Each drive slot 114 is provided with an end clearance 302 between the brake rotor 112 and the alignment bushing 118. This end clearance 302 allows for expansion and contraction of the related components due to changes in temperature (such as results from the elevated temperatures resultant from braking and the subsequent reduction in temperature when braking no longer is occurring).

In a brake rotor 112 that is fixedly mounted to a hub or wheel, the fixed mountings of the brake rotor 112 resist any expansion and contraction of the brake rotor 112, thus inducing stresses as the brake rotor 112 is unable to expand or contract at the fixed points. Furthermore, areas of a fixed brake rotor 112 away from the fixed points are not as constrained from expanding or contracting as needed as are areas near the fixed points. The resultant uneven distribution of expansion and contraction results in an uneven distribution of stresses reducing the potential life of the brake rotor 112 under fixed mounting conditions.

The provision of the end clearance 302 prevents the brake rotor 112 from being exposed to additional stresses due to expansion and contraction, as compared to a solidly mounted rotor 112. The parallel drive surfaces 116 on the rotor drive slots 114 and the parallel drive surfaces 202 on the alignment bushings 118 provide substantially increased load bearing surfaces between the two components, as compared to the embodiment where the alignment bushing 118 is essentially cylindrical in cross-section in the central channel area 120. The increased load-bearing surface reduces local stresses at the contact areas and reduces wear and the chance of failure of the components. This is especially important when using composite brake rotors 112, such as brake rotors made from carbon fiber.

Figure 4:
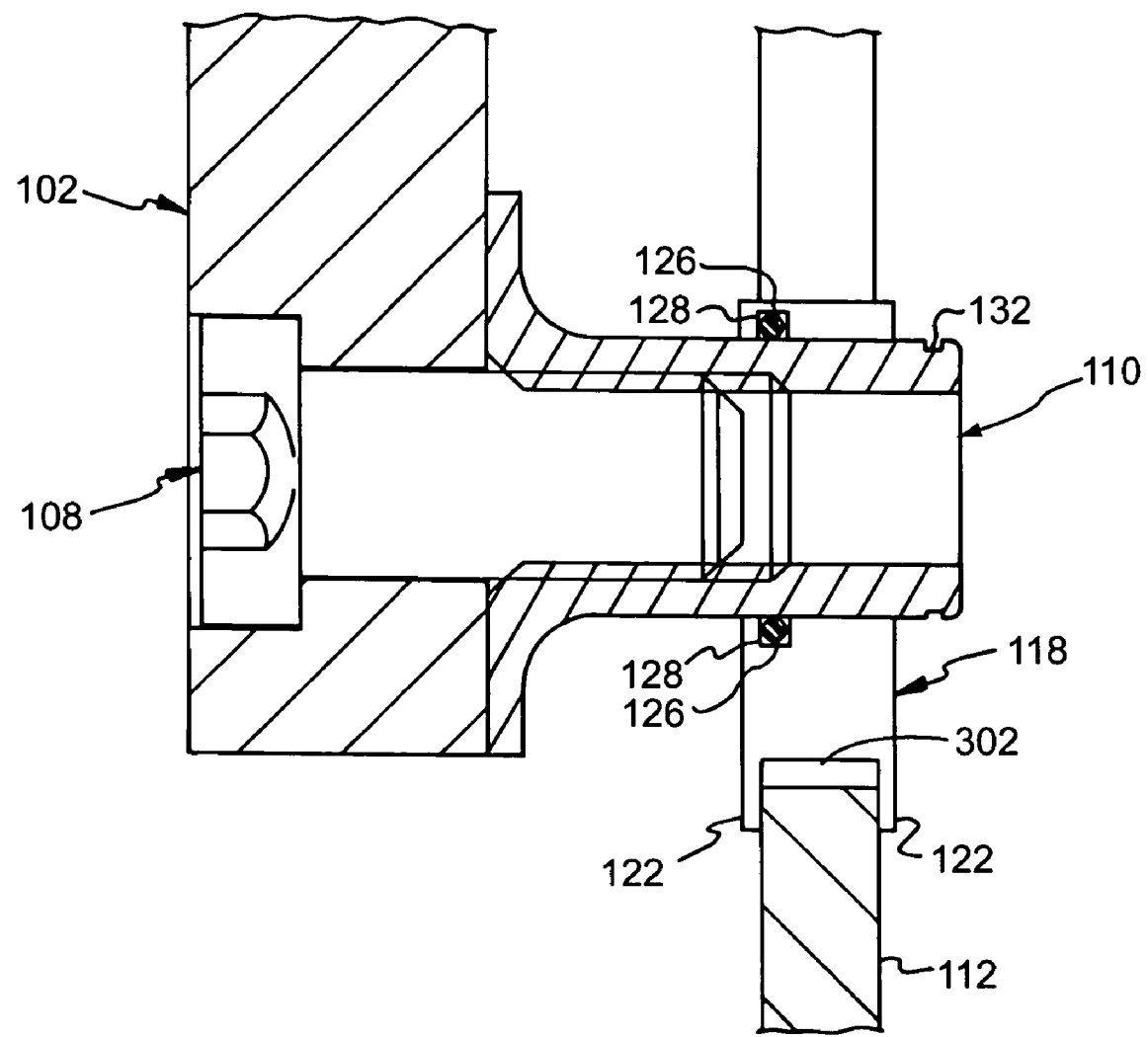
FIG. 4 shows a partial sectional view of a disc brake rotor mounting system according to one embodiment of the invention taken along section line A—A of FIG. 3.

FIG. 4 shows a cross-sectional view of a disc brake rotor mounting system according to one embodiment taken along section line A—A of FIG. 3. The drive pin attachment bolt 108 is shown engaging the drive pin 110. The drag ring 126, within a corresponding drag ring groove 128, is shown gripping the drive pin 110. The end clearance 302, as discussed in reference to FIG. 3, and the flanges 122 gripping the brake rotor 112 are also visible.

Figure 5:
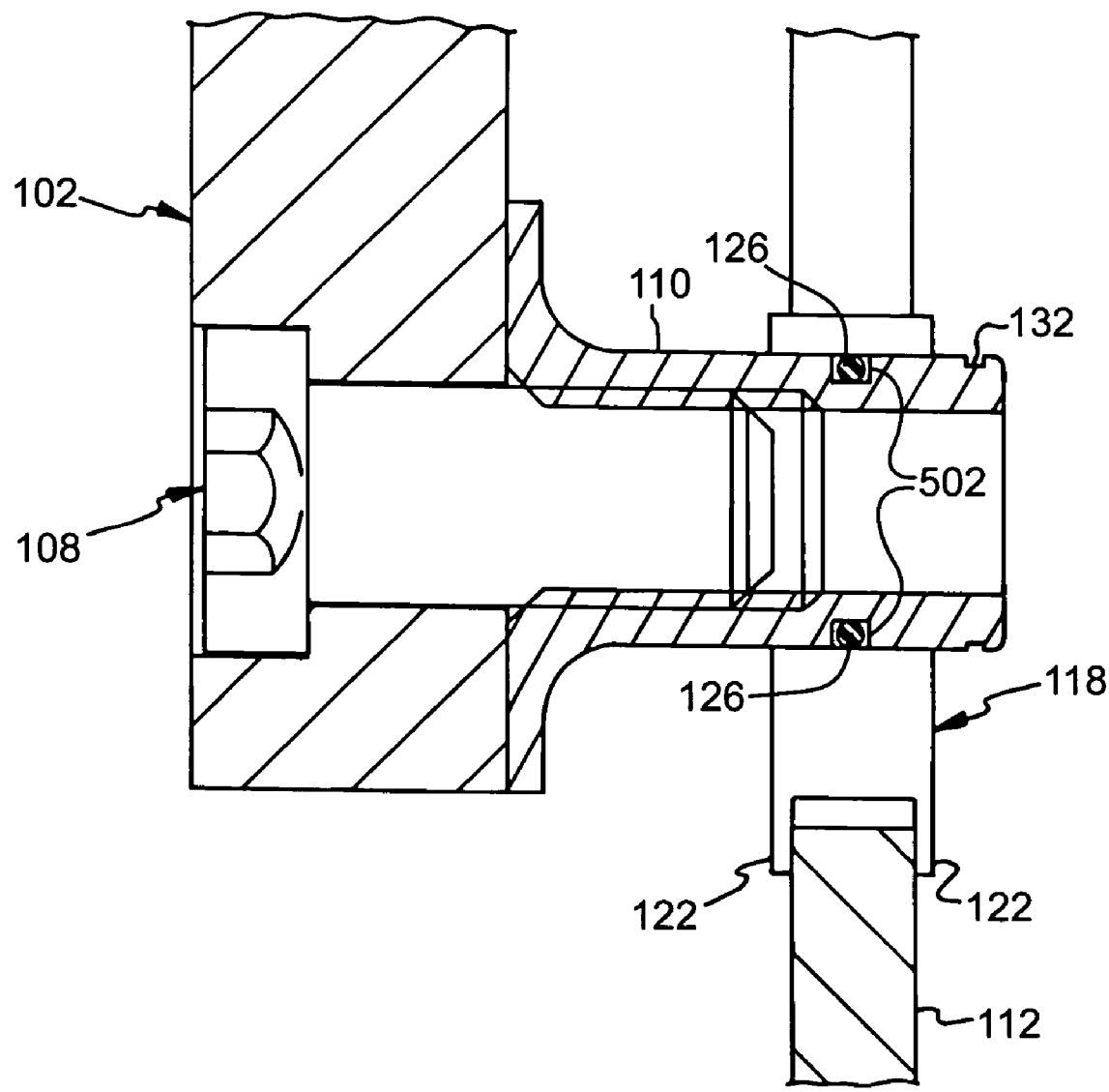
FIG. 5 shows a partial sectional view of a disc brake rotor mounting system according to a second embodiment of the invention taken along section line A—A of FIG. 3.

FIG. 5 shows a cross-sectional view of a disc brake rotor mounting system according to another embodiment of the invention taken along section line A—A of FIG. 3. In this embodiment, contrasting to the embodiment shown in FIG. 4, the drag ring 126 is held in a drag ring groove 502 formed in the drive pin 110. In operation, the drag ring 126 exerts a frictional force on the alignment bushing 118 which presents a threshold or minimum amount of force necessary to shift the alignment bushing 118 relative to the drive pin 110. In operation, the forces exerted on the brake rotor 112 during braking easily overcome the frictional force of the drag ring 126 with the result that the act of braking causes the brake rotor 112 to self-align on the drive pins 110.

Typically, the thickness of the drag ring 126 is 0.003–0.005 inches less than the width of the drag ring grooves 128 and 502, thereby permitting the alignment bushing 118 to freely move axially on the drive pin 110 by a like amount. This arrangement permits the brake rotor 110 to move slightly away from a stationary brake pad without repositioning the drag ring with respect to the drive pin (FIG. 4) or repositioning the alignment bushing with respect to the drag ring (FIG. 5).

Also typically, the maximum axial movement of the alignment bushing 118 on the drive pin 110 that is possible by overcoming the resistance of the drag ring 126 is 0.375–0.500 inches. As shown in FIG. 4, this is the distance between the face of the alignment bushing 118 that faces the hub 102 and the shoulder of the drive pin 110 on which the alignment bushing is mounted. As described above, this arrangement permits the alignment bushing 118 and the brake rotor 112 that is held by the bushing to be axially repositioned on the drive pin 110 as the associated caliper-activated brake pads close.

The present invention achieves all of the objectives set forth in the background section above. The system allows the rotor to be self-aligning with respect to the wheel without the need for a precision wheel mounting surface. As the brake pads wear, the rotor is automatically re-positioned to the mean center distance between the pads.

While various embodiments have been described in illustrating the invention, the scope of the invention is not to be considered limited thereby, but only in accordance with the following claims.

What is claimed is:

1. A wheel assembly comprising:
   a hub;
   a plurality of drive pins mounted on said hub;
   a rotor having a plurality of slots;
   a plurality of alignment bushings, each said alignment bushing slidably inserted into one of said slots in said rotor, each said alignment bushing slidably held by one of said drive pins; and
   a plurality of drag rings, each said drag ring located between one of said alignment bushings and the drive pin by which said one alignment bushing is held, each said drag ring resisting relative axial movement between the associated alignment bushing and drive pin, whereby, when said rotor is engaged by calipers during braking, the resistance provided by the drag ring may be overcome allowing the associated alignment bushing to move axially relative to the associated drive pin to a position in which the forces applied by the calipers to the opposed sides of the rotor are balanced and, when the calipers are released, the resistance provided by the drag ring maintains the relative axial positions of the associated alignment bushing and drive pin.

2. A wheel assembly as in claim 1, further comprising:
   an adapter mounted on said hub, said drive pins mounted to said adapter.

3. A wheel assembly as in claim 1,
   wherein each said alignment bushing has a drag ring groove, and one of said drag rings is held in said drag ring groove.

4. A wheel assembly as in claim 1,
   wherein each said alignment bushing has at least one flange, said flange substantially restricting movement of said alignment bushing in a direction perpendicular to the plane of one of said slots of said rotor when the alignment bushing is inserted therein.

5. A wheel assembly as in claim 4,
   wherein each said alignment bushing has at least two flanges, said flanges substantially restricting movement of said alignment bushing in a direction perpendicular to the plane of one of said slots of said rotor when the alignment bushing is inserted therein.

6. A wheel assembly as in claim 1, further comprising:
   a plurality of retaining rings, each said drive pin having a retaining ring groove for holding a respective one of said retaining rings to retain one of said alignment bushings on each of said drive pins, and one of said retaining rings is mounted in each of said retaining ring grooves.

7. A wheel assembly as in claim 1,
   wherein said slots of said rotor have substantially straight sides; and
   wherein said alignment bushings have substantially straight sides along one axis.

8. A wheel assembly as in claim 7,
   wherein said slots of said rotor are substantially D-shaped in configuration; and
   wherein said alignment bushings are substantially D-shaped in configuration.

9. A disc brake rotor mounting system comprising:
   a rotor having a plurality of slots;
   a plurality of alignment bushings, each configured to be slidably insertable into one of said slots in said rotor and each having a drive hole therein;
   a plurality of drive pins, each configured to be mountable on a hub and to be slidably insertable into the drive hole of one of said alignment bushings; and
   a plurality of drag rings, each said drag ring located between one of said drive pins and the alignment bushing into which said one drive pin is inserted, each said drag ring resisting relative axial movement between the associated alignment bushing and drive pin, whereby, when said rotor is engaged by calipers during braking, the resistance provided by the drag ma may be overcome allowing the associated alignment bushing to move axially relative to the associated drive pin to a position in which the forces applied by the calipers to the opposed sides of the rotor are balanced and, when the calipers are released, the resistance provided by the drag ring maintains the relative axial positions of the associated alignment bushing and drive pin.

10. A disc brake rotor mounting system as in claim 9, further comprising:
    an adapter configured to be mountable on said hub and configured to receive said drive pins, said drive pins being mountable on said adapter.

11. A disc brake rotor mounting system as in claim 9,
    wherein each said alignment bushing has at least a partial groove configured to hold one of said drag rings.

12. A disc brake rotor mounting system as in claim 9,
    wherein each said alignment bushing has at least one flange, said flange configured to substantially restrict movement of said alignment bushing in a direction perpendicular to the plane of one of said slots of said rotor when the alignment bushing is inserted therein.

13. A disc brake rotor mounting system as in claim 12,
    wherein each said alignment bushing has at least two flanges, said flanges configured to substantially restrict movement of said alignment bushing in a direction perpendicular to the plane of one of said slots of said rotor when the alignment bushing is inserted therein.

14. A disc brake rotor mounting system as in claim 9, further comprising:
    a plurality of retaining rings, and each said drive pin having a retaining ring groove for holding a respective one of said retaining rings for retaining one of said alignment bushings on each of said drive pins.

15. A disc brake rotor mounting system as in claim 9,
    wherein said slots of said rotor have substantially straight sides; and
    wherein said alignment bushings have substantially straight sides.

16. A disc brake rotor mounting system as in claim 15,
    wherein said slots of said rotor are substantially D-shaped; and wherein said alignment bushings are substantially D-shaped.

17. A method of installing a disc-drive rotor onto a hub comprising:

mounting a plurality of drive pins on said hub;

inserting a plurality of alignment bushings into respective slots in a rotor;

mounting said rotor onto said hub by inserting each of said drive pins into a hole in a respective one of said alignment bushings;

inserting a drag ring between each of said drive pins and the associated alignment bushing into which the drive pin is inserted, said drag ring resisting relative axial movement between the associated alignment bushing and drive pin, whereby, when said rotor is engaged by calipers during braking, the resistance provided by the drag ring maybe overcome allowing the associated alignment bushing to move axially relative to the associated drive pin to a position in which the forces applied by the calipers to the opposed sides of the rotor are balanced and, when the calipers are released, the resistance provided by the drag ring maintains the relative axial positions of the associated alignment bushing and drive pin; and securing said rotor to said hub by installing a retaining ring on each of said drive pins.

18. A method of installing a disc-drive rotor onto a hub as in claim 17 further comprising:

mounting an adapter on said hub; and wherein said mounting a plurality of drive pins on said hub is replaced with mounting a plurality of drive pins on said adapter.

19. A method of installing a disc-drive rotor onto a hub as in claim 17 wherein:

each said drag ring is inserted into a receiving groove in each of said alignment bushings for engaging a surface of the associated drive pin.

20. A method of installing a disc-drive rotor onto a hub as in claim 17 wherein:

each said drag ring is inserted into a receiving groove on each of said drive pins for engaging a surface of the associated alignment bushing.

21. A wheel assembly as in claim 1, wherein each said drive pin has a drag ring groove, and one of said drag rings is held in said drag ring groove.

22. A disc brake rotor mounting system as in claim 9, wherein each said drive pin has at least a partial groove configured to hold one of said drag rings.

* * * * *